Inventors Thure B. Bogert
Sven T. Wilk
By Wenderoth, Lind & Ponack
Attorneys

Inventors
Thure B. Bogert
Sven T. Wilk
By Wenderoth, Lind & Ponack
Attorneys

Nov. 9, 1965 T. B. BOGERT ETAL 3,217,296

INFORMATION TRANSMISSION SYSTEM HAVING CARD MEANS FOR CONTROLLING THE INFORMATION CHANNEL

Filed May 24, 1961 4 Sheets-Sheet 3

Inventors
Thure B. Bogert
Sven T. Wilk
By Wenderoth, Lind & Ponack
Attorneys

Nov. 9, 1965 T. B. BOGERT ETAL 3,217,296
INFORMATION TRANSMISSION SYSTEM HAVING CARD MEANS
FOR CONTROLLING THE INFORMATION CHANNEL
Filed May 24, 1961
4 Sheets-Sheet 4

Inventors
Thure B. Bogert
Sven T. Wilk
By
Wenderoth, Lind & Ponack
Attorneys

United States Patent Office 3,217,296

Patented Nov. 9, 1965

3,217,296

INFORMATION TRANSMISSION SYSTEM HAVING CARD MEANS FOR CONTROLLING THE INFORMATION CHANNEL

Thure Bernhard Bogert, Malmo, and Sven Tore Wilk, Hohog, Sweden, assignors to Aktiebolaget Addo, Malmo, Sweden, a corporation of Sweden Filed May 24, 1961, Ser. No. 112,301

Claims priority, application Sweden, May 27, 1960, 5,204/60

5 Claims. (Cl. 340—147)

When a data source and a data receiver are caused to cooperate through one or more information channels it is often desired that this cooperation be realized according to a certain program which shall permit of variation in dependence on whether certain stipulations are fulfilled or not fulfilled by the information supplied by the data source.

This problem is solved by the present invention which relates to a program control device and is characterised by the fact that the device has a plurality of program channels which can be conditioned for being electrically enabled by means of markings on a program control card advanced through the device and which are divided into at least two groups viz. an information group and a stipulation group, said groups each comprising at least one channel and the channel or channels of the stipulation group being electrically connected to one or more stipulation output channels in a data source and having been conditioned by means of the program control card being enabled by means of an electric stipulation output signal from the data source and adapted when enabled to set one or more electric circuit means at least one of which is adapted when set to enable the channel or channels of the information group which are adapted, when enabled, either directly or through one or more information channels in the data source to electrically enable one or more information channels in a data receiver.

In a program control device of this type it is also often desired that the program shall be determined not only by the stipulations established but also by the nature of a prevailing program instruction. The program control device according to the invention can therefore preferably be designed also in such a way that its program channels are divided, in addition to the information group and the stipulation group, into a program instruction group comprising at least one channel, the channel or channels of said group being electrically enabled either directly by the conditioning through the program control card or indirectly after such conditioning by the setting of the circuit means.

Figure 1A:
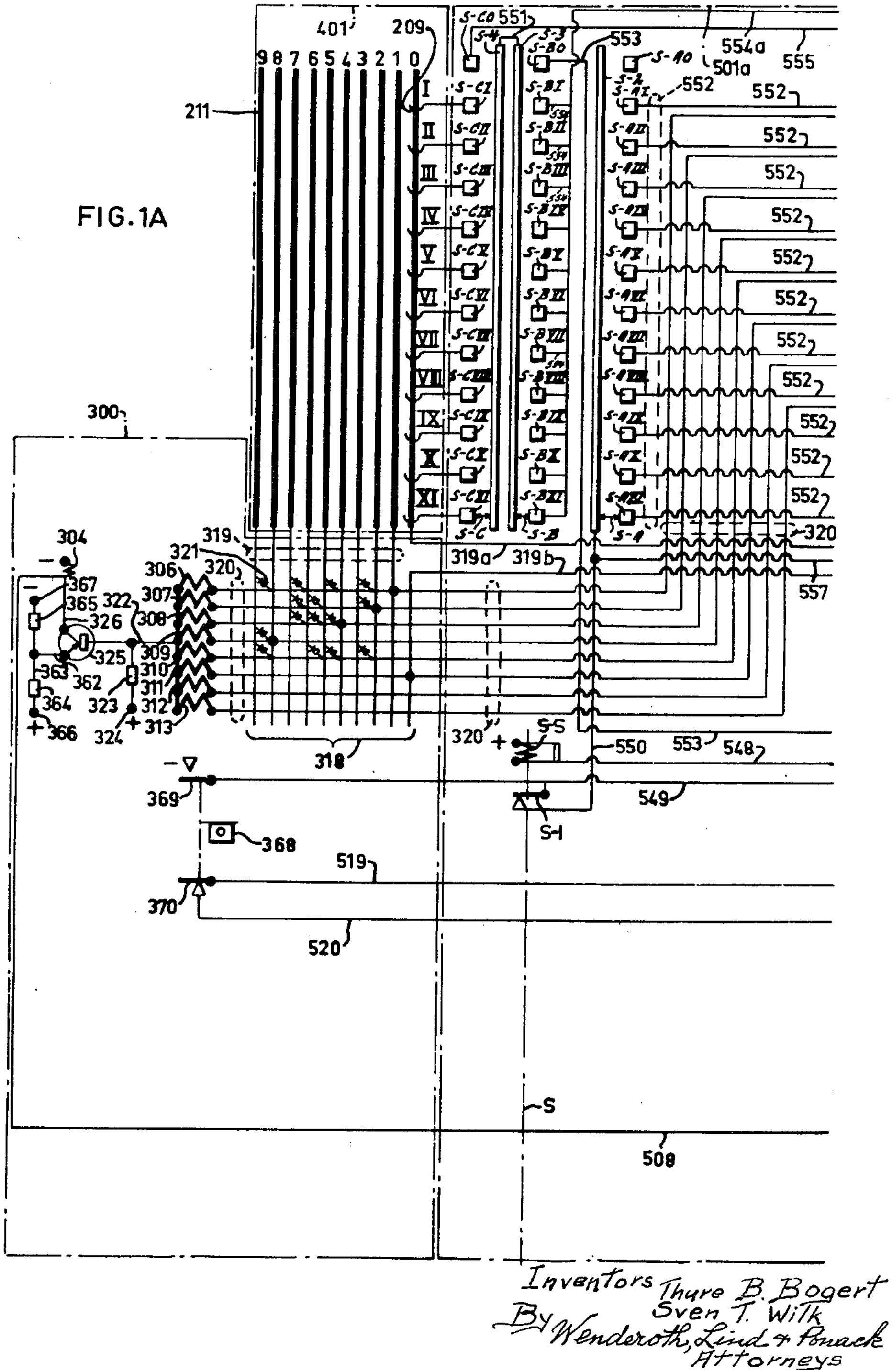
Figure 1B:
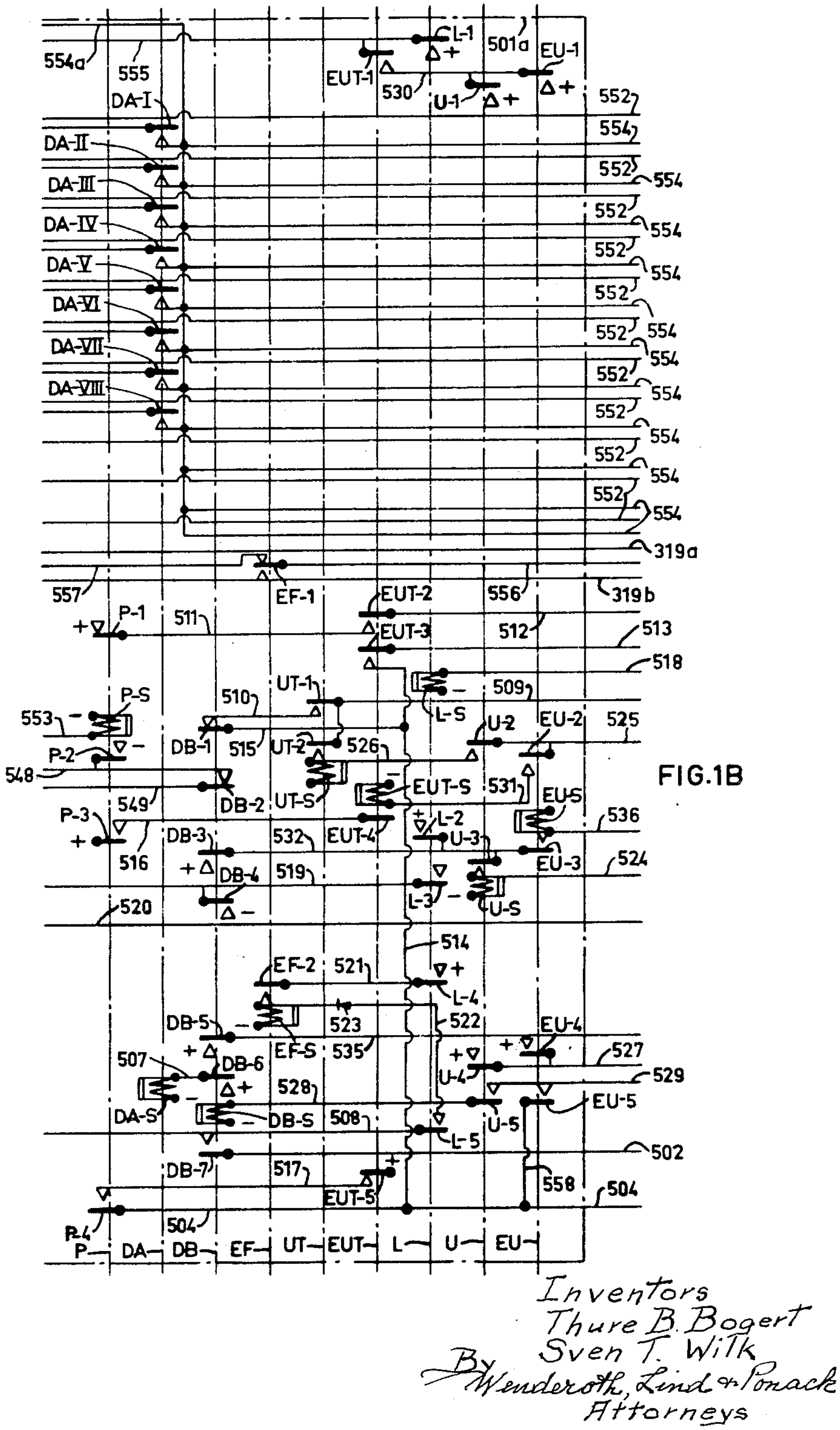
Figure 1C:
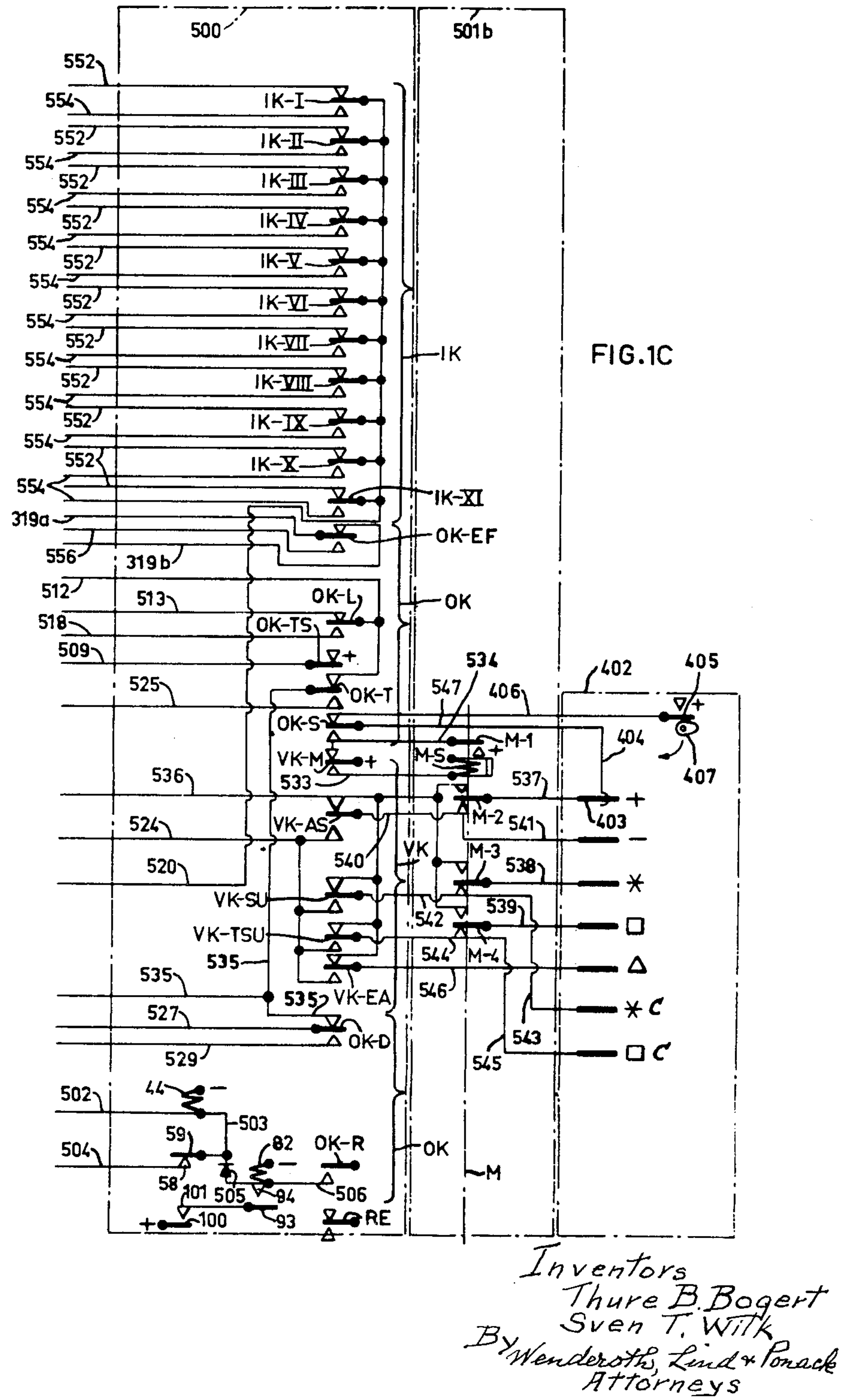
Figure 2:
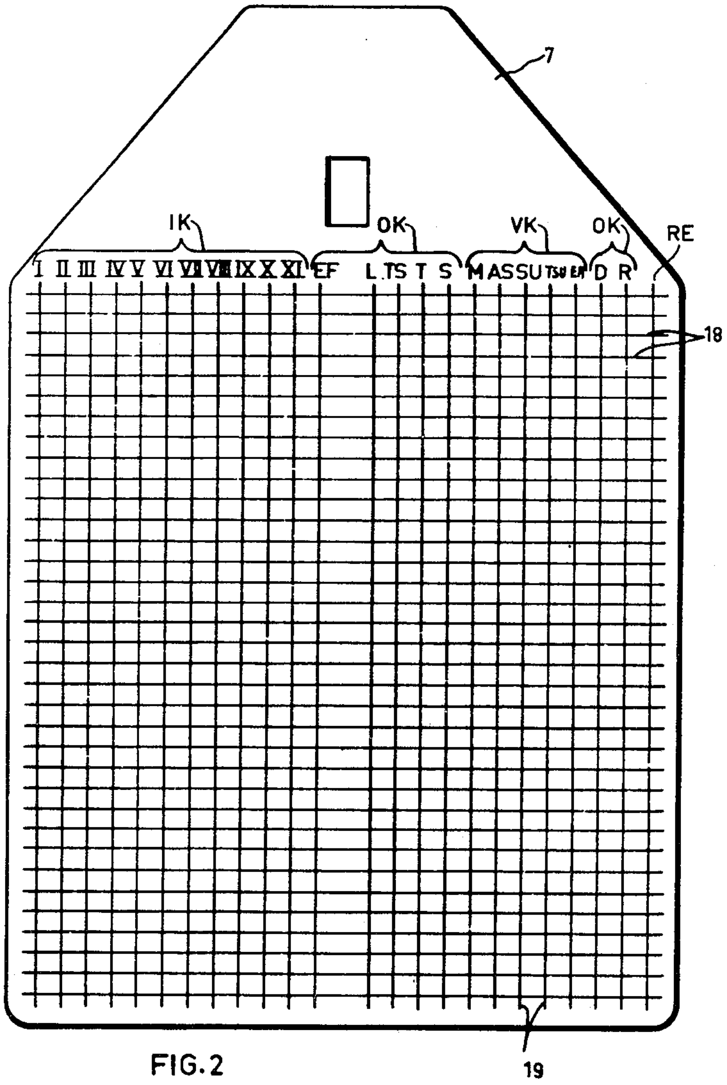

For a better understanding of the invention an embodiment thereof will be described in more detail in the following, reference being made to the accompanying drawings, in which FIG. 1 comprised of FIGS. 1A, 1B, and 1C, is an electric circuit diagram for a program control device according to the invention;

FIG. 2 is a view of a program control card employed in this program control device.

Although the nature of the data source and the data receiver and the mechanical construction of the program control mechanism proper may be varied within broad limits without departing from the spirit and scope of the invention defined in the claims there will be described, by way of an example not restricting the invention, a device in which the data source is in the form of an adding or bookkeeping machine, the data receiver is in the form of a tape punch, and the program control device substantially is of the mechanical construction described in Thure Bernhard Bogert U.S. Serial No. 134,067, filed August 25, 1961.

*The data source*

As already mentioned the data source is in the form of an adding or bookkeeping machine of a known type. Of this machine, FIG. 1 merely shows a diagrammatic coordinate setting means within the dash and dot rectangle 401 to make it possible electrically to read out numbers set in said machine, and a data source means diagrammatically shown within a dash and dot rectangle 402 for supplying electrical stipulation output signals from the adding or bookkeeping machine.

The coordinate setting means 401 may be for instance of the type described in United States Patent application Serial No. 153,935 filed November 21, 1961 now patent number 3,139,821. It has ten contact bars 211 for digits 0 through 9, and eleven contact springs 209 can establish contact with selected contact bars 211 by means of the digit setting means of the machine in the eleven decades thereof in the manner indicated in the above-mentioned French patent. For a better understanding of the description to follow the contact bars 211 have been identified by the digits 0 through 9 they represent, and contact springs 209 have been identified by the decades I–XI to which they belong. Contact springs 209 are thus arranged in eleven digital information channels I–XI in the data source for transferring digital information to the data receiver in a manner described in the following.

The data source means 402 of the adding or bookkeeping machine for delivering electrical stipulation output signals includes a coordinate setting means similar to the coordinate setting means 401 and having seven contact bars 403 which are identified by their pertaining stipulations adding "+," subtracting "—," total "*," subtotal "□," non-add "Δ," negative total or credit total "* C," and negative subtotal or credit subtotal "□ C." By means of the sign type bar of the machine a contact spring 404 can establish contact with either of contact bars 403 in the same way as contact brushes 209 can establish contact with the contact bars 211.

In addition, the data source means 402 includes a make contact 405 which is connected to a line 406 and actuated, toward the end of the operating cycle of the machine, by a cam 407 on a shaft making one revolution during each operating cycle of the adding or bookkeeping machine, after contact springs 209 and 404 have been set during the operating cycle. When make contact 405 is actuated by cam 407, line 406 is connected to the positive pole of the source of current (not shown).

*The data receiver*

Although there are many different ways of designing the data receiver, it is shown in the present instance in the form of a tap punch of the type described in U.S. Patent 2,969,174 (U.S. pat. appln. No. 796,347) filed March 2, 1959.

eisetaoi

The parts of this tape punch which are of interest in the present connection are diagrammatically shown within a dash and dot frame 300 in FIG. 1. The tape punch is intended for a tape having eight channels, and for each channel the tape punch has a punch operating electromagnet 306–313. One or more of the electromagnets can be energized simultaneously to punch holes in a transverse row on said tape according to the desired code. For this purpose eight lines 320 each connect one terminal of a magnet 306–313 to a diagrammatically indicated, prior-art diode net 318 to which arrive 10 lines 319, 319*a*–319*b* from each of the contact bars 211 of the data source in the coordinate setting means 401. In the diode net 318, the lines 319, 319a–319b are connected to lines 320 either directly or through diodes 321 in such a way that a desired code is obtained, i.e. current can flow in the manner described in the following through those lines 320 connected during an operating cycle of the tape punch to the positive pole of a source of current, which directly or each through one diode 321 in the diode net 318 are in connection with that line 319, 319a–319b which is momentarily connected to the negative pole of the source of current in the manner described in the following. Lines 319, 319a–319b between the coordinate setting means 401 of the data source and the diode net 318 of the data receiver thus constitute digital information channels between the data source and the data receiver, and the lines 320 between the diode net 318 and the magnets 306–313 constitute digital information channels in the data receiver.

The lines 320 which are connected each to one terminal of the magnets 306–313 are held under positive voltage in that the other terminals of the magnets 306–313 are connected to a common line 322 which is connected through a resistor 323 to the positive pole of the source of current (not shown) at 324. Line 322 is also connected with the base of a transistor 325. The emitter of the transistor is also held at a positive voltage in that it is connected over a line 362 to a connecting line 363 between a small resistor 364 and a large resistor 365, of which resistor 364 is connected to the positive pole of the source of current at 366 while the large resistor 365 is connected to the negative pole of the source of current at 367. The collector of the transistor is connected over a line 326 to one terminal of an electromagnet 304 the other terminal of which is connected to the negative pole of the source of current. When current flows through one or more of lines 320 to one of lines 319, 319a–319b via the diode net 318 during an operating cycle of the tape punch, one or more of magnets 306–313 are enabled to select desired code punches, and a voltage drop arises through resistor 323 whereby the earlier blocked transistor 325 becomes heavily conductive and allows current to flow from line 362 through the transistor and line 326 to the electromagnet 304. When this magnet is energized it releases an operating cycle of the tape punch so that the punches enabled by magnets 306–313 punch one or more holes in a transverse row on the tape and the tape is advanced one step in its longitudinal direction in a known manner. During the operating cycle of the data receiver which has been started by magnet 304 a shaft in the tape punch rotates through 90°, and secured to this shaft is a cam 368 which thereby temporarily closes a make contact 369 and opens a rest contact 370 for a purpose indicated in the following.

*The program control device*

In FIG. 1 the program control device is shown composed of two parts 500 and 501 which are shown within a dash and dot frame 500 and 501a, 501b, respectively (the division of part 501 within two different frames 501a and 501b has been taken only for drawing-technical reasons).

In part 500 FIG. 1 shows the means of instant interest of the program control device according to Thure Bernhard Bogert U.S. Serial No. 134,067, filed August 25, 1961, and concerning the details of the mechanical design and function of these means reference is made to said patent application. Part 500 has twenty-four feelers which are arranged in a row and actuate the same number of switches shown in FIG. 1. These switches are divided into an information channel group IK, a program instruction channel group OK, and a stipulation channel group VK. The information channel group comprises eleven switches IK–I, IK–II . . . IK–XI of the one-pole reversing type. The program instruction channel group comprises seven switches, viz. a one-pole reversing switch OK–EF to prevent in a manner described in the following the punching of zeros ahead of a number set in the coordinate setting means 401 of the data source, a one-pole reversing switch OK–L to determine whether a number set in the coordinate setting means 401 of the data source shall be read out to the data receiver 300, a rest contact OK–TS to terminate a tabulation described in the following, a one-pole reversing switch OK–T to determine whether a tabulation is to be initiated, a one-pole reversing switch OK–S to determine whether an operating cycle of the program control device is to be initiated by the data source means 402 or by the program control device proper, a one-pole reversing switch OK–D to determine whether a duplication described in the following is to be done, and a make contact OK–R to initiate a return of a program control card described in the following to initial position. The stipulation channel group comprises a one-pole reversing switch VK–M to determine minus stipulations, a one-pole reversing switch VK–AS to determine adding and subtracting stipulations, a one-pole reversing switch VK–SU to determine total stipulations, a one-pole reversing switch VK–TSU to determine subtotal stipulations, and a one-pole reversing switch VK–EF to determine the stipulation non-add. The twenty-fourth switch RE is a spare switch which is not used in the present embodiment.

As is described in more detail in Thure Bernhard Bogert U.S. Serial No. 134,067, filed August 25, 1961, the feelers (not shown) which operate the above switches feel a program control card 7 which is shown in FIG. 2. This card is divided into twenty-four channels 19, one for each feeler, and in the present instance thirty-five rows 18. In each row one or more holes can be arranged each in one channel 19. The program control card 7 is advanced stepwise past the row of feelers so that they feel their respective channels row after row. When there is no hole in a given channel in a given row the pertaining switch in groups IK, OK and VK occupies the FIG. 1 position in which the movable contact spring engages a fixed contact situated above said spring in FIG. 1, but when there is a hole the movable contact spring of the switches is swung downwards as viewed in FIG. 1 to engage, in case of the reversing switches, the lower fixed contact in FIG. 1, merely to open, in the case of rest contact OK–TS, an electric connection, and to establish, in case of make contact OK–R, an electric connection. The channels 19 of the program control card are identified in FIG. 2 corresponding to the switches in FIG. 1. Thus there are an information channel group IK having eleven information channels I–XI, a program instruction channel group OK having the channels EF, L, TS, S, D and R, and a stipulation channel group VK having the channels M, AS, SU, TSU and EA, and finally there is the spare channel RE which is not employed in the present instance.

The mechanisms for stepwise advancing the program control card 7 row after row during the program cycle and for returning the card to initial position at the end of the program cycle are described in detail in Thure Bernhard Bogert U.S. Serial No. 134,067, filed August 25, 1961, for which reason it will here be sufficient to describe and show the electric operating means for producing these card movements, these electric means having been given the same numerals in FIG. 1 as in said patent application to facilitate their identification. The stepwise advance of the program control card during the program cycle is produced by supply of current to an electromagnet 44 which at each energization advances the program control card one step. One terminal of electromagnet 44 is permanently connected to the negative pole of the source of current (not shown) while the other terminal of the magnet can be connected to the positive pole of the course of current either via line 502 or via a line 503. Line 503 is connected on one hand to a rest contact 58, 59 which is connectible to the positive pole of the current source via a line 504, and on the other to a diode 505 which can be connected via line 506 to the positive pole of the current source through the make contact OK–R when the program control card is to be returned to initial position. Also connected to line 506 is one terminal of an electromagnet 82, the other terminal of which is connected to the negative pole of the current source. Diode 505 blocks the supply of current via line 502 or 504 to the magnet 82 which can thus be supplied with current only via line 506 and make contact OK–R. When magnet 82 is energized via line 506 it closes a make contact 93, 94 connected to a make contact 100, 101 which is connected to the positive pole of the current source and is closed when the program control card 7 does not occupy its initial position. When the feeler of the program instruction channel group thus in channel OK–R meets a hole in its channel the switch OK-R is closed whereby the two magnets 82 and 44 are energized. This will close make contact 93, 94 so that magnets 82 and 44 are connected to the positive pole of the current source also via make contact 100, 101 (the program control card does not occupy its initial position). As is described in more detail in Thure Bernhard Bogert U.S. Serial No. 134,067, filed August 25, 1961, this energization of magnet 44 implies that said magnet initiates an operating cycle of the program control device but interrupts this cycle when the feelers have left their engagement with the program control card 7. Magnet 82 provides that the operating cycle initiated by magnet 44 is effected in such a way that the program control card 7 instead of being advanced stepwise is continuously returned to its initial position in which make contact 100, 101 is opened so that magnets 82 and 44 are deenergized and the temporarily interrupted operating cycle of the program control device is terminated. It should also be observed that rest contact 58, 59 through which magnet 44 can be energized to initiate a stepwise advance of the program control card is interrupted some time after the start of each operating cycle of the program control device in order that a stepwise advance may be obtained instead of a returning of the program control card to initial position, which return movement requires a relatively long energization of magnet 4. In return cycles said long energization is ensured by means of make contact 100, 101 although the switch OK–R initiating the return movement is opened some time after the starting of the return cycle in that the feelers are moved away from the program control card. No switch corresponding to the rest contact 58, 59 is required in line 502 which can also initiate a step advance operation of the magnet 44, as line 502 can be connected for program-stepping purposes to line 326 in the data receiver 300 and is always supplied with merely a short current pulse each time the data receiver 300 effects a punching operation.

Part 501*a*, 501*b* of the program control device includes a step-by-step switch described in the following and ten relays having a tripping coil one terminal of which is connected to the negative pole of the current source, and a plurality of relay contacts which are arranged on a dash and dot line passing through the respective tripping coil and designated for the identification of the respective relay by one or more letters constituting the designation of the respective relay as a whole. As viewed from the left in FIG. 1 there is thus shown a program stepping relay P which under certain conditions serves to produce a stepwise advance of the program control card and which in addition to its tripping coil P–S has a rest contact P–1 connected to the positive pole of the current source, a make contact P–2 connected to the negative pole of the current source, a make contact P–3 connected to the positive pole of the current source, and a make contact P–4 connected to line 504.

The relay DA situated immediately to the right of relay P cooperates with the relay DB situated immediately to the right thereof to produce a duplicating operation described in the following, and these two relays are always cut in together. In addition to the tripping coil DA–S relay DA has eight make contacts DA–I, DA–II . . . DA–VIII. In addition to the tripping coil DB–S the relay DB has two rest contacts DB–1, DB–2, three make contacts DB–3, DB–5, DB–6 connected to the positive pole of the current source, a make contact DB–4 connected to the negative pole of the current source, and a further make contact DB–7. The make contact DB–5 is furthermore connected through a branched conduit 535 to the movable contact of the reversing switch OK–T and to the upper fixed contact of the reversing switch OK–D. Make contact DB–6 is also connected over a line 507 to the relay tripping coil DA–S so that the relay DA is cut in and cut out each time relay DB is cut in and cut out, respectively. Make contact DB–7 is connected to line 502 and through a line 508 also to line 326 in the data receiver 300.

To the right of relay DB is a relay EF which serves to prevent punching of zeros standing ahead of a number set in the coordinate setting means 401. In addition to the tripping coil EF–S relay EF has a reversing switch EF–1 and a make contact EF–2.

Immediately to the right of the relay EF is a relay UT which is cut in when a fulfilled stipulation exists and tabulation of the program contral card is to be initiated. The relay UT has a tripping coil UT–S a make contact UT–1 and a rest contact UT–2. The make contact UT–1 is connected through a line 509 to contact OK–TS and through a line 510 to rest contact DB–1. Rest contact UT–2 is connected to tripping coil UT–S and to line 509.

To the right of relay UT is a relay EUT which is tripped when a not fulfilled stipulation exists and a tabulation of the program control card is to take place. Relay EUT has a tripping coil EUT–S, four make contacts EUT–1 . . . EUT–4, and a rest contact EUT–5. Make contact EUT–2 is connected through a line 511 to the relay contact P–1 and through a line 512 to the movable contact spring of the reversing switch OK–L and to the fixed upper contact of the reversing switch OK–T. Make contact EUT–3 is connected through a line 513 to the upper fixed contact OK–L and through a line 514 to line 504 and furthermore through a line 515 to relay contact DB–1. Make contact EUT–4 is connected to the tripping coil EUT–S and to a line 516 which leads to relay contact P–3. Rest contact EUT–5 is connected to the positive pole of the current source and through a line 517 to relay contact P–4 which is also connected to line 504.

To the right of the relay EUT is a relay L which is cut in when a digital information set up in the coordinate setting means 401 is to be read out to the data receiver 300. The relay L has a tripping coil L–S which is connected through a line 518 to the lower fixed contact of the reversing switch OK–L, three make contacts L–1, L–2 and L–4 connected to the positive pole of the current source, a make contact L–3 connected to the negative pole of the current source, and a make contact L–5. Make contact L–3 is connected through a line 519 to the relay contact DB–4 and to the rest contact 370 of the data receiver 300, which is connected through a line 520 to all the movable contact springs in the reversing switches IK–I, IK–II . . . IK–XI of the information group IK. Make contact L–4 is connected through a line 521 to the relay contact EF–2. Make contact L–5 is connected to line 508 and to the relay tripping coil EF–S through a line 522 in which a diode 523 is inserted. Diode 523 allows current to pass merely in one direction from make contact L–5 to coil EF–S.

Disposed to the right of relay L in FIG. 1 is a relay U which is cut in when a fulfilled stipulation exists. Relay U has a triping coil U–S, two make contacts U–1 and U–4 connected to the positive pole of the current source, and three further make contacts U–2, U–3 and U–5. Tripping coil U–S is connected through a line 524 to the lower fixed contacts in reversing switches VK–AS, VK–SU, VK–TSU and VK–EA. Make contact U–2 is connected through a line 525 to the lower fixed contact of reversing switch OK–T and to the relay UT–S through a line 526. Make contact U–4 is connected through a line 527 to the movable contact spring of reversing switch OK–D. Make contact U–5 is connected through a line 528 to the relay tripping coil DB–S and furthermore through a line 529 to the lower fixed contact of reversing switch OK–D.

To the right of relay U there is shown in FIG. 1 a relay EU which is cut in when a not fulfilled stipulation exists. Relay EU has in addition to tripping coil EU–S a make contact EU–1 connected to the positive pole of the current source and through a line 530 to relay contacts EUT–1 and U–1. Relay EU furthermore has a make contact EU–2 which is connected to line 525 and through a 531 to relay coil EUT–S. Relay EU also has a make contact EU–3 connected to the relay coil EU–S and through a line 532 to the relay contacts DB–3, L–2 and U–3, of which contacts DB–3 and L–2 are connected to the positive pole of the current source while contact U–3 is connected to relay tripping coil U–S. Relay EU has a make contact EU–4 which is connected to the positive pole of the current source and to line 527. Finally, relay EU has a make contact EU–5 which is connected to lines 504 and 529.

Within part 501*b* in FIG. 1 there is finally a relay M which is cut in when the stipulation shall be subtraction, negative total or negative subtotal. Tripping coil M–S of relay M is connected through a line 533 to the lower fixed contact of reversing switch VK–M. Relay M has a make contact M–1 which is connected to the positive pole of the current source and through a line 534 to the lower fixed contact of reversing switch OK–S and to the upper fixed contact of reversing switch VK–M, the movable contact spring of which latter switch is connected to the positive pole of the current source. In addition, relay M has three reversing switches M–2, M–3 and M–4, the movable contact springs of which in the cut-out state of the relay engage the lower fixed contact (FIG. 1) in the respective reversing switches. The upper fixed contacts of reversing switches M–2, M–3, M–4 are connected to each other through a branched line 536 and to the upper fixed contacts of reversing switches VK–AS, VK–SU, VK–TSU and VK–EA as well as to relay coil EU–S. The movable contact springs of reversing switches M–2, M–3, M–4 are connected through lines 537, 538 and 539 respectively, to the contact bars 403 in the data source means 402 for the positive stipulations "+," "*" and "□," respectively. The lower fixed contact of reversing switch M–2 is connected through a line 540 to the movable contact of reversing switch VK–AS and through a line 541 to the contact bar 403 for the stipulation "—." The lower fixed contact of reto the movable contact of reversing switch VK–SU and through a line 543 to the contact bar 403 for stipulation "*C." The lower fixed contact of reversing switch M–4 is connected through a line 544 to the movable contact of reversing switch VK–TSU and through a line 545 to the contact bar 403 for stipulation "□C."

It should also be mentioned in this connection that a line 546 connects contact bar 403 for "Δ" directly to the movable contact of reversing switch VK–EA, and that a line 547 connects the movable contact 404 of the data source means 402 to the movable contact in the reversing switch OK–S.

Step-by-step switch S earlier briefly mentioned and comprised in the program control device is of prior-art construction and is diagrammatically shown to the left within the frame 501*a* in FIG. 1. It has a stepping coil S—S one terminal of which is connected to the positive pole of the current source while the other terminal is connected through a line 548 to relay contacts P–2 and DB–2. In addition, relay S has a stepping rest contact S–1 which is connected through a line 549 to relay contact DB–2 and cam-operated make contact 369 in the data receiver, and through a line 550 to a contact bar S–2 in relay S. Relay S has two further contact bars S–3 and S–4 which are interconnected by means of a line 551. Furthermore relay S has three sliding contacts S–A, S–B and S–C which slide each along one of the contact bars S–2, S–3, S–4 and one row of twelve contacts S–AO, S–AI, S–AII . . . S–AXI and S–BO, S–BI, S–BII . . . S–BXI, respectively, and S–CO, S–CI, S–CII . . . S–CXI. In initial position sliding contacts S–A, S–B, S–C connect contacts S–AXI, S–BXI and S–CXI, respectively, to the respective contact bars S–2, S–3, S–4, and upon each energization of relay coil S—S all sliding contacts S–A, S–B, S–C are simultaneously stepwise advanced by one contact spacing upward as viewed in FIG. 1 until they reach contacts S–AO, S–BO and S–CO, respectively, whereupon they are returned during the next following step directly to contacts S–AXI, S–BXI and S–CXI, respectively.

In the embodiment illustrated contact S–AO has no function and consequently has no out-going connecting line. Contacts S–AI . . . S–AXI, however, are connected each through one line 552 to their respective upper fixed contacts of reversing switches IK–I . . . IK–XI. Contact S–BO is connected to relay coil P–S through a line 553. Contacts S–BI . . . S–BXI are connected each to their respective one of the lower fixed contacts of reversing switches IK–I . . . IK–XI, each through one line 554. To avoid crowding of the drawings the individual lines 554 within part of FIG. 1 have been aggregated in the form of a single line or cable 534*a* but actually lines 554 are fully independent of each other over their whole length. Contact S–CO is connected through a line 555 to relay contacts EUT–1 and L–1. Contacts S–CI . . . S–CXI are each connected through lines to one of the contact springs 209 in the coordinate setting means 401 of the data source.

Lines 554 which are connected to the lower fixed contacts in reversing switches IK–I . . . IK–VIII and to contacts S–BI . . . S–BVIII are also connected to each one of relay contacts DA–I . . . DA–VIII which are also connected each with one of the lines 320 leading from the magnets 306–313 of the data receiver 300.

*Function*

Reversing switches IK–I . . . IK–XI of the information channel group serve to determine, by feeling holes in the information channels I–XI of the program control card 7, whether information contained either in the coordinate setting means 401 of the data source in channels I–XI of said means, or in the form of holes in information channels IK–I—IK–VIII of the program control card 7 is to be transferred to the data receiver 300 in dependence on the other circuit means in the program control device. As for the transfer of information in the coordinate setting means 401 of the data source information is transferred only from the channels I–XI which have holes in the corresponding channels of the program control card 7. As for the transfer of information contained in the form of holes in the channels I–VIII of the program control card 7, the punch magnets 306–313 of the data receiver 300 are enabled directly without the intermediary of the coordinate setting means 401 of the data source, in accordance with the hole constellation in channels I–VIII of the program control card 7, i.e. the tape is punched in the data receiver with the same hole constellation as that of the program control card 7 in the respective row of channels I–VIII. This will be described more in detail in the following. The latter type of information transfer directly from the program control card 7 to the tape in the data receiver 300 is termed duplication. The purpose of having reversing switches IK–I—IK–XI enable merely certain channels I–XI in the coordinate setting means 401 of the data source for transferring information to the data receiver 300 is that one shall have the possibility of limiting the number of digits transferred corresponding to for instance the column space of a punched card in which the digits shall be inserted in a known manner from the tape produced in the data receiver 300. Such transfer of information from the coordinate setting means 401 of the data source to the data receiver 300 is termed read-out. At the read-out it is sometimes desired that zeros possibly appearing to the left of a number in the coordinate setting means 401 shall not be punched in the tape of the data receiver 300 although the information channels containing these zeros are conditioned for enabling by holes in the respective information channels I–XI on the program control card 7. Such suppression of the punching of zeros is termed "no preliminary punching" and is controlled by means of relay EF and program instruction channel OK–EF and program control card 7.

In the embodiment chosen for the elucidation of the invention the program control device shall be able to carry out the following program instructions which are the most important and the most illustrative for the function of the device (but not the only ones possible), in the desired order during a complete program control cycle, the required hole marking being simultaneously indicated in the program instruction channels OK of program control card 7:

(*A*) *Holes in read-out channel OK–L.*—To start a read-out operation there is required either a fulfilled or a not fulfilled stipulation.

(*B*) *Holes in the tabulation starting channel OK–T.*—(1) At not fulfifiled stipulation the program control card 7 is to be advanced by one step.

(2) At fulfilled stipulation the program control card is to be advanced until the feelers meet a hole in the tabulation stopping channel OK–TS of the program control card.

(*C*) *Holes in the read-out channel OK–L and holes in the tabulating starting channel OK–T.*—(1) At not fulfilled stipulation read-out is to take place without any stepwise advance of the program control card 7.

(2) At fulfilled stipulation no read-out is to take place but the program control card is to be advanced instead, until the feelers meet a hole in the tabulation stopping channel OK–TS of the card.

(*D*) *Holes in duplicating channel OK–D.*—(1) At not fulfilled stipulation the program control card is to be advanced by one step only, without any duplication.

(2) At fulfilled stipulation duplication is to take place and in connection therewith advance of the program control card by one step.

(*E*) *Holes in duplicating channel OK–D and holes in tabulation starting channel OK–T.*—(1) At fulfilled stipulation duplication is to take place and then tabulation until the feelers meet a hole in the tabulation stopping channel OK–TS.

(2) At not fulfilled stipulation no duplication is to take place but the program control card shall instead be advanced by one step.

(*F*) *Holes in return channel OK–R.*—The program control card is returned to initial position.

In addition to the holes, as listed above, in the instruction channel group OK of the program control card 7 there are provided in each particular case in the same row 18 on the card as the instruction marking when read-out or duplication instructions are concerned, one or more holes in the information channel group IK of the card to mark what information channels I–XI are to be enabled at the read-out and duplication respectively. In addition, there is in each row 18 of the program control card 7 except for the last row in which a hole is provided in channel OK–R for returning the card to initial position, a hole marking in some of the channels of the stipulation channel group VK to establish a stipulation which when fulfilled or not fulfilled results in the execution of different instructions in accordance with the above list.

*Case A with holes in stipulation channel VK–AS and holes in information channels IK–I—IK–IV on the program control card and adding in the data source*

In this case in which a fulfilled stipulation exists the movable contact springs of reversing switches IK–I—IK–IV, OK–L and VK–AS in part 500 have been adjusted by feeling of the program control card 7 into engagement with the respective lower fixed contacts while contact spring 404 in the data source means 402 engages the contact bar 403 for "+." Near the end of the machine stroke of the data source cam 407 closes make contact 405 in data source means 402. This will cut in relay U in that current flows from the positive pole of the current source through make contact 405, line 406, reversing switch OK–S, line 507, contact spring 404, contact bar 403 for "+," line 537, reversing switch M–2, line 540, the set reversing switch VK–AS, line 524 and relay coil U–S to the negative pole of the current source. Cutting in of relay U implies a fulfilled stipulation.

By the cutting-in of relay U its relay contacts are adjusted from the position shown in FIG. 1. This adjustment in the present instance is of importance only in regard of relay contacts U–3 and U–4. By the adjustment of relay contact U–4 line 527 is connected to the positive pole of the current source, and current flows from said pole through line 527, reversing switch OK–D, line 535, reversing switch OK–T, line 512 to the set reversing switch OK–L and through line 518 and relay coil L–S to the negative pole of the current source. this will cut in relay L which implies that read-out shall take place. At the cut-in of relay L its relay contacts are adjusted from the position shown in FIG. 1, and in the present instance merely the adjustment of relay contacts L–1, L–2 and L–3 is of importance. By the closing of relay contact L-2 the positive pole of the current source is connected to line 532 which is connected to relay coil U–S via the closed relay contact U–3. This will produce holding of relay U–S so that this remains cut in also after the make contact 405 is opened at the end of the machine stroke of the data source.

By the adjustment of relay contact L–3 the negative pole of the current source is connected to the movable contact springs of reversing switches IK–I . . . IK–XI through line 519, rest contact 370 in data receiver 300 and line 520. Connection is hereby established from the negative pole of the current source to the positive pole thereof via the non-adjusted reversing switch IK–XI, the associated line 552, contact S–AXI of the step-by-step switch, the sliding contact S–A engaging this contact in its position of rest, contact bar S–2, line 550, the non-adjusted rest contact S–1, line 549, relay contact DB–2, line 548 and step-by-step switch coil S—S so that step-by-step switch S makes one step and moves sliding contacts S–A, S–B and S–C to the next following contacts S–AX, S–BX and S–CX. In this position also the circuit described is established through coil S—S of the step-by-step switch since reversing switch IK–X also occupies the position of rest according to FIG. 1. The stepwise advance in step-by-step switch S thus continues step by step in the manner described until sliding contacts S–A, S–B and S–C have reached their contacts in channel IV. For in this channel the stepping circuit described is not closed any more since reversing switch IK–IV according to the above premises is set for reading out the fourth digit in a number set up in the coordinate setting means 401 of the data source. The negative pole of the current source is now connected from line 520 through the set reversing switch IK–IV to line 554 and contact S–BIV of the step-by-step switch and furthermore through sliding contact S–B, contact bar S–3, line 551, contact bar S–4, sliding contact S–C and contact spring 209 in channel IV of the coordinate setting means 401 of the data source. In dependence on the digit adjustment of said contact spring 209 the circuit described extends from the negative pole of the current source over some of contact bars 211 of the coordinate setting means to the diode net 318 of the data receiver and through one or more lines 320 to one or more of punch magnets 306–313 of the data receiver and through line 322 and resistor 323 to the positive pole of the current source at 324 so that one or more of the punch magnets enable their respective punches for punching holes in the tape when the data receiver performs an operating cycle due to transistor 325 having been energized in the manner earlier described by supply of current to the punch magnets. If contact spring 209 in channel IV of coordinate setting means 401 is set to contact bar 211 of any of digits 1 through 9 the circuit described extends from the coordinate setting means to the diode net 318 through one of lines 319. Is, however, said contact spring 209 set to contact bar 211 for digit 0 the circuit extends through line 319*a*, reversing switch OK–EF and line 319 to diode net 318.

By the transistor 325 being made conductive current can flow from the positive pole of the current source at 366 through resistor 364, line 362, the transistor and line 326 to electromagnet 304 which causes the data receiver to make an operating cycle for entering the information received from the data source on the tape. Line 326 is also connected to relay coil EF–S through line 508, closed relay contact L–5, line 522 and diode 523 so that relay EF is cut in when transistor 325 becomes conductive, but this cutting-in of relay EF is of no importance in the present connection.

When data receiver 300 effects its operating cycle for punching the digital information received in the manner described from the channel or decade IV of the data source, cam 368 temporarily shifts switches 369 and 370 from the position shown in FIG. 1. Rest contact 370 opens the connection between the reversing switch (line 520) of information channel group IK and the negative pole of the current source at relay contact L–3 (line 519) and make contact 369 connects step-by-step switch coil S—S to the negative pole of the current source through line 549, relay contact DB–2 and line 548 so that the step-by-step switch moves its sliding contacts S–A, S–B, S–C to channel III. When data receiver 300 has performed its operating cycle the operation described in connection with channel IV for transferring the digital information from channel III in coordinate setting means 401 of the data source to the data receiver 300, and the same operation is then repeated also in connection with channels II and I so that the entire digital information in the four data source decades selected by holes in information channels I–IV of the program control card 7 is transferred to the tape in the data receiver.

At the end of the information transfer in channel I the sliding contacts S–A, S–B, S–C of the step-by-step switch are stepwise moved to contacts S–AO, S–BO and S–CO, respectively. The positive pole of the current source is hereby connected at the closed relay contact L–1 to coil P–S of relay P through line 555, step-by-step switch contact S–CO, sliding contact S–C, bar S–4, line 551, bar S–3, sliding contact S–B, contact S–BO and line 553. This will cut in relay F for a stepwise advance of the program control card 7. This stepwise advance is established in the present instance by the positive pole of the current source at relay contact EUT–5 being connected to electromagnet 44 with the aid of make contact P–4 of relay P through line 517, make contact P–4, line 504, rest contact 58, 59 and line 503. Advance of the program control card 7 by one step (one row 18) then takes place in the manner earlier described. At this advance of the program control card 7 all switches in channels IK, OK and VK are reset whereby coils U–S and L–S of the cut-in relays are deenergized by their circuits being opened in reversing switches VK–AS and OK–L, respectively. By the cutting-in of relay P coil S—S of the step-by-step switch is connected to the negative pole of the current source through line 548 and relay contact P–2 so that the sliding contacts S–A, S–B, S–C of the step-by-step switch are moved through a further step to contacts S–AXI, S–BXI, S–CXI of the eleventh decade. After this the parts have returned to the position shown in FIG. 1, and when the feelers search the next row 18 on the program control card 7 the switches in channels IK, OK, VK are set for a new program cycle.

*Case A with holes in stipulation channels VK–AS and holes in information channels IK–I—IK–IV on the program control card and total taking in the data source*

In this case where a not fulfilled stipulation exists program control is effected exactly in the same manner as described above with the following exceptions. As total taking is effected in the data source contact spring 404 engages contact bar 403 for "*" instead of contact bar 403 "+." When cam 407 in the data source closes contact 405 the positive pole of the current source is connected to relay coil EU–S instead of relay coil U–S through line 406, reversing switch OK–S, line 547, contact spring 404, contact bar 403 for "*," line 538, reversing switch M–3, line 542, reversing switch VK–SU and line 536. When relay EU is cut in line 527 is connected to the positive pole of the current source over relay contact EU–4 instead of relay contact U–4. This will cut in relay L in the manner earlier described, and a holding circuit for relay EU is hereby established over relay contact L–2, line 532 and closed make contact EU–3.

*No preliminary punching of zeros at read-out*

Should for instance in the alternatives described above of case A a zero stand in decade IV of the data source and a hole exist in channel EF of the program control card 7 the same operation is obtained as in the above alternatives of case A with the exception that no punching operation is performed by data receiver 300 when sliding contacts S–A, S–B, S–C of the step-by-step switch S feel their contacts in channels IV, for when said contacts are so felt the negative pole of the current source is connected at the relay contact L–3, which is connected to the contact S–BIV of the step-by-step switch in the manner previously described, to coil S—S of the step-by-step switch through bar S–3, line 551, bar S–4, sliding contact S–C, contact S–CIV, contact spring 209 in decade IV of the data source, contact bar 211 for digit 0 in coordinate setting means 401, line 319*a*, the contact spring in reversing switch OK–EF which spring engages the lower fixed contact by reason of the hole in channel EF of the program control card 7, line 556 connected to said reversing switch OK–EF, rest contact EF–1, line 557 connected thereto, line 549, relay contact DB–2 and line 548 so that step-by-step switch S is advanced by one step to channel III where according to the premises there is a digit other than zero in decade III of the data source, whereupon the operation will be the same as that described above in connection with the alternative cases A. Should a zero be set up in decade II of the data source this zero will be punched in data receiver 300 since relay EF is cut in in the manner earlier described at the transfer of information from decade III of the data source where there is a digit other than zero. When relay EF is so cut in make contact EF–2 is closed so that a holding of relay EF is obtained in that the positive pole of the current source is connected at the closed relay contact L–4 to the relay coil EF–S through line 521 and make contact EF–2. By this cutting-in of relay EF reversing switch EF–1 is so adjusted that contact bar 211 for digit 0 in coordinate setting means 401 will be connected to diode net 318 through line 319*a*, reversing switch OK–EF, line 556, the adjusted reversing switch EF–1 and line 319*b*.

*Case B1 with holes in stipulation channels VK–AS on the program control card and total taking in the data source*

In this case there is a not fulfilled stipulation. When cam 407 in the data source closes contact 405 relay EU is thus cut in in the manner previously described. When said relay is so cut in the positive pole of the current source is connected through contact EU–4 to line 527 which is connected to relay coil EUT–S through reversing switch OK–D, line 535, reversing switch OK–T adjusted thanks to the hole in channel T of the program control card 7, line 525, closed make contact EU–2 and line 531, whereby relay EUT is cut in. At this cutting-in the adjustment of relay contacts EUT–2 and EUT–3 only is of importance. By the cutting-in of relay EUT the positive pole of the current source is connected at relay contact P–1 through line 511, closed relay contact EUT–2, line 512, reversing switch OK–L, line 513, the adjusted relay contact EUT–3, line 514, line 504, rest contact 58, 59 and line 503 to electromagnet 44 producing the stepwise advance of the program control card 7 so that the program control card 7 is advanced by one step (one row 18). At this stepwise advance reversing switch OK–T and cut-in relays EU and EUT are reset so that the parts return to the position in FIG. 1.

*Case B2 with holes in stipulation channel VK–AS on the program control card and adding in the data source*

There is in this case a fulfilled stipulation so that relay U is cut in in the manner previously described when contact 405 is closed by cam 407 in the data source. The positive pole of the current source is hereby connected via make contact U–4 to line 527 which through reversing switch OK–D, line 535, the adjusted reversing switch OK–T (holes in channel T of the program control card), line 525, closed relay contact U–2 and line 526 is connected to relay coil UT–S so that relay UT is cut in. This will establish a circuit from the positive pole of the current source at the closed switch OK–TS through line 509, closed relay contact UT–1, line 510, rest contact DB–1, line 515, line 514, line 504, rest contact 58, 59 and line 503 to electromagnet 44 producing stepwise advance of the program control card 7 so that said card is stepwise advanced. This stepwise advance will, however, be restricted to merely one step, for relay UT has been cut in with holding effect as the positive pole of the current source at switch OK–TS is also connected to relay coil UT–S through line 509 and make contact UT–2 when relay UT is cut in in the manner previously described. As a consequence, electromagnet 44 will advance the program control card 7 step by step until the feeler actuating switch OK–TS meets a hole in channel TS of the program control card 7, when the connection with the positive pole of the current source is opened by adjustment of contact OK–TS.

*Case C1 with holes in stipulation channel VK–SU and holes in information channels IK–I—IK–IV on the program control card and adding in the data source*

Here is a not fulfilled stipulation, for which reason relay EU is cut in when cam 407 in the data source closes make contact 405 so that a circuit is established from the positive pole of the current source to the negative pole thereof via closed contact 405, line 406, reversing switch OK–S occupying the position in FIG. 1, line 547, contact spring 404, contact bar 403 for "+," line 537, reversing switch M–2 occupying the position in FIG. 1, line 540, reversing switch VK–AS occupying the position in FIG. 1, line 536 and relay coil EU–S. As in case C1 channel T of the program control card 7 has a hole, relay EUT is also cut in like in case B1. However, no stepwise advance of the program control card 7 is obtained like in case B1, since reversing switch OK–L has now been adjusted from the position in FIG. 1, whereby the positive pole of the current source at rest contact P1 is not connected to electromagnet 44 for stepwise advance like in case B1 but is instead connected to relay coil L–S through line 511, relay contact EUT–2, line 512, reversing switch OK–L and line 518 so that relay L is cut in. By relay L being cut in decades IV–I of the data source are read out to the data receiver 300 in the same way as in case A. As distinct from case A the read-out is not terminated in the present instance by an advance of the program control card 7 by one step in the manner described for case A, since electromagnet 44 cannot, as is necessary for an advance of the card after a read-out operation, be connected to the positive pole of the current source via relay contacts P–4 and EUT–5 due to relay contact EUT–5 being opened by relay EUT having been cut in as mentioned above.

In case C1 the program control card will thus remain stationary until a fulfilled stipulation arises according to case C2. Thus a single row of holes 18 (FIG. 2) on the program control card can control for instance a plurality of successive addings, and the program control card is only advanced when a total taking is done according to case C2.

*Case C2 with holes in the stipulation channel VK–SU and holes in the information channels IK–I—IK–IV on the program control card and total taking in the data source*

Here is a fulfilled stipulation, and relay U is therefore cut in when contact 405 is closed by means of cam 407 in the data source so that the positive pole of the current source is connected to relay coil U–S through cam-actuated contact 405, line 406, reversing switch OK–S occupying the position in FIG. 1, line 547, contact spring 404, contact bar 403 for "*," line 538, reversing switch M–3 occupying the position in FIG. 1, line 542, reversing switch VK–SU set from the position in FIG. 1, and line 524. When relay U is cut in the same circuits are established as those described above in connection with case B2. As these circuits do not include the lines connected to reversing switches IK–I—IK–IV and OK–L adjusted through holes in the program control card, no read-out takes place but the program control card 7 is advanced stepwise or tabulated until reversing switch OK–TS is opened by a hole in channel TS of the program control card, like in case B2.

*Case D1 with holes in stipulation channel VK–AS and holes in information channels IK–I—IK–IV on the program control card and total taking in the data source*

Here is a not fulfilled stipulation and as a consequence relay EU is cut in in the manner previously described when contact 405 is closed by means of cam 407 in the data source. At this cutting-in of relay EU only the setting of contacts EU–4 and EU–5 is of importance in the present instance as this will connect the positive pole of the current source to the electromagnet 44 stepwise advancing the program control card 7 through relay contact EU–4, line 527, reversing switch OK–D set through holes in channel D of the program control card 7, line 529, relay contact EU–5, line 558, line 504, rest contacts 58, 59 and line 503. The stepwise advance of the program control card 7 is interrupted after one step since the feelers reset the adjusted reversing switches VK–AS and OK–D during the step to the position in FIG. 1 and as a consequence they open the circuits which were closed at the start of the program cycle. Although reversing switches IK–I—IK–IV have been adjusted by means of holes in the program control card no information transfer takes place from the data source to the data receiver, as no circuit is closed via these adjusted reversing switches during the program cycle here concerned.

*Case D2 with holes in stipulation channel VK–AS and holes in information channels IK–I—IK–IV on the program control card and adding in the data source*

Here is a fulfilled stipulation and relay U is therefore cut in in the manner previously described when cam 407 closes contact 405 at the end of the operating cycle of the data source. At the closing of make contact U–4 of relay U a circuit is closed from the positive pole of the current source to the negative pole thereof via contact U–4, line 527, reversing switch OK–D adjusted by means of the hole in channel D of the program control card, line 529, closed relay contact U–5, line 528 and relay coil DB–S. This will cut in relay DB, and at the closing of contact DB–6 of this relay a closed circuit is also established through relay coil DA–S so that relay DA is also cut in. Contacts DA–I—DA–VIII will thereby close for a purpose mentioned in the following.

When relay DB is cut in contact DB–3 is closed so that relay U is held through line 532, and by closing of contact DB–4 the movable contact springs of reversing switches IK–I—IK–XI are connected to the negative pole of the current source from contact DB–4 through line 519, rest contact 370 in data receiver 300, and line 520. As a result, contacts S–AV—S–AXI of the step-by-step switch S will be connected, it is true, to the negative pole of the current source through the respective line 552 and the associated non-adjusted reversing switch IK–V—IK–XI but step-by-step switch still is not caused to operate, as described in case A, as the circuit described in case A and extending through coil S–S is now opened at the adjusted rest contact DB–2.

The connection of the contact springs of reversing switches IK–I—IK–XI in the manner described to the negative pole of the current source via line 520 has the following effect in the present instance. Through the holes in channels IK–I—IK–IV of the program control card the contact springs of reversing switches IK–I—IK–IV engage the lower fixed contacts of the reversing switches so that the negative pole of the current source will be connected to the positive pole of the current source through lines 554 of information channels I–IV, closed relay contacts DA–I—DA–IV, the associated lines 320, punch magnets 306–309, line 322 and resistor 323. This will produce in the manner already described a punching operation in the data receiver 300 which punches or duplicates in the tape the hole combination appearing in channels I–VIII of the program control card, i.e. in the present instance holes in channels I–IV.

The punching operation in data receiver 300 will connect line 508 to the positive pole of the current source via transistor 325 in the manner previously described, and current flows from line 508 through the closed relay contact DB–7 and line 502 to electromagnet 44 so that the program control card is advanced by one step in the manner previously described. During the punching operation and the stepwise advance of the program control card the circuits described are opened by contact 370 in the data receiver and reversing switches IK–I—IK–IV, VK–AS and OK–D.

*Case E1 with holes in the stipulation channel VK–AS and holes in information channels IK–I—IK–IV on the program control card and adding in the data source*

Here is a fulfilled stipulation, and a duplicating cycle is effected in the manner described in case D2 but the operation is not terminated by an advance of the program control card by one step. On the contrary the stepwise advance of the card continues until the feeler in channel OK–TS meets a hole in the respective channel of the program control card. This is due to the following deviation from case D2.

When relays U and DB are cut in at the start of the duplicating cycle a circuit is closed, which cuts in relay UT. This circuit extends from the positive pole of the current source to the negative pole thereof through relay contact DB–5, line 535, the adjusted reversing switch O–T (holes in the tabulation starting channel T of the program control card), line 525, relay contact U–2, line 526 and relay coil UT–S. When cut in relay UT is held through switch OK–TS connected to the positive pole of the current source, line 509 and closed relay contact UT–2. At the end of the duplicating cycle the program control card is advanced by one step like in case D2 while all adjusted contacts and relays are reset except for relay UT which is still held in the described manner. The stepwise advance of the program control card is therefore continued in such a way that current flows from the positive pole of the current source to the negative pole thereof via reversing switch OK–TS, line 509, relay contact UT–1, line 510, rest contact DB–1 closed again after the duplicating cycle, line 515, line 514, line 504, rest contact 58, 59, line 503 and electromagnet 44. The advance of the program control card thus continues in the manner previously described until the feeler, operating switch OK–TS, meets a hole in channel TS of the program control card and interrupts the stepping circuit described at switch OK–TS so that relay UT is cut out.

*Case E2 with holes in stipulation channel VK–AS and holes in information channels IK–I—IK–IV on the program control card and total taking in the data source*

Here is a not fulfilled stipulation, and relay EU is therefore cut in in the manner previously described when cam 407 closes contact 405 at the end of the operating cycle of the data source. The program control card is hereby advanced by one step in the manner described in connection with case D1, without duplication.

*Case F*

When the feeler, operating switch OK–R, meets a hole in channel R of the program control card switch OK–R is closed so that the positive pole of the current source is connected to electromagnets 82 and 44 through line 506, diode 505 and line 503, whereby the program control card is returned to initial position in the manner previously described.

In the above description of the function each program cycle has been initiated by closing of contact 405 by means of cam 407 in the data source but it is sometimes desired to have a program cycle without the data source being simultaneously required to effect an operating cycle. In such a case a program cycle can be initiated by means of a hole in channel S of the program control card. At the feeling of such a hole reversing switch OK–S is adjusted so that contact spring 404 in the data source is connected, for the initiation of a program cycle, to the positive pole of the current source either via reversing switch VK–M or relay contact M–1, and not by means of contact 405.

In the above examples A–E the stipulation for the program control has been established in each particular case by a hole in channel VK–AS of the program control card, and this implies that a fulfilled stipulation is obtained both upon adding and subtracting in the data source. If it is desired to distinguish between the operations adding and subtracting in regard of a fulfilled and not fulfilled stipulation one has to arrange in addition to the hole in channel VK–AS a hole also in channel VK–M on the program control card. Then a fulfilled stipulation is obtained upon subtraction in the data source and a not fulfilled stipulation upon adding in the data source. Through the hole in channel VK–M on the program control card reversing switch VK–M is so adjusted that coil M–S of relay M is connected to the positive pole of the current source over line 533 and reversing switch VK–M. Relay M is therefore cut in so that relay reversing switches M–2, M–3, M–4 are adjusted from the position shown in FIG. 1. By this adjustment of reversing switch M–2 data source contact bar 403 for adding is connected through line 537, reversing switch M–2 and line 536 directly to relay coil EU–S in relay EU which is to be cut in at a not fulfilled stipulation, while data source contact bar 403 for subtraction is still connected in the manner presupposed in cases A–E and therefore cuts in relay U, which implies a fulfilled stipulation, if there is a hole in channel VK–AS of the program control card.

Relay reversing switches M–3 and M–4 perform a corresponding function in regard of the operations total, negative total and subtotal, negative subtotal, respectively. The operation "non-add" of the data source cannot of course have a positive and negative nature, and therefore contact bar 403 in question is connected through line 546 directly to reversing switch VK–EA without the intermediary of any relay contact in relay M.

While the various circuits in the program control device have been described as established by means of relays it is readily understood by those skilled in the art that instead of relays use can be made of electronic switches or a combination of electronic switches and relays. It will also be obvious that the circuits in the program control device can be varied within broad limits to adapt the device to different requirements. The invention must not therefore be considered restricted by the embodiment described, but only as indicated in the appended claims.

What we claim is:

1. A program control device, comprising a plurality of groups of program channel means, including an information group and a stipulation group, a program control card, means for advancing said card through the device, markings on said card for conditioning said program channel means for being electrically enable, a data source, stipulation output channel means in said data source, means for electrically connecting said program channel means of said stipulation group to said stipulation output channel means of said data source, means generating an electric stipulation output signal in said stipulation output channel means of said data source, a data receiver, information input channel means in said receiver, means for electrically connecting said program channel means of said information group to said information input channel means of said receiver, settable electric circuit means connected to said program channel means, said program channel means of said stipulation group being enabled, when conditioned by said means of markings on said card, by the stipulation output signal for setting said electric circuit means, said circuit means, when set, enabling said program channel means of said information group, being conditioned by said means of markings on said card, for electrically enabling said information input channel means of said receiver.

2. A program control device, comprising a plurality of groups of program channel means, including an information group and a stipulation group, a program control card, means for advancing said card through the device, markings on said card for conditioning said program channel means for being electrically enabled, a data source, information output channel means in said data source, interconnecting means for electrically interconnecting said program channel means of said information group and said information output channel means, stipulation output channel means in said data source, means for electrically connecting said program channel means of said stipulation group to said stipulation output channel means of said data source, means generating an electric stipulation output signal in said stipulation output channel means of said data source, a data receiver, information input channel means in said receiver, means for electrically connecting said program channel means of said information group to said information input channel means of said receiver, settable electric circuit means connected to said program channel means, said program channel means of said stipulation group being enabled, when conditioned by said means of markings on said card, by the stipulation output signal for setting said electric circuit means, said circuit means, when set, enabling said program channel means of said information group, being conditioned by said means of markings on said card, for electrically enabling said information output channel means in said data source and said information input channel means of said receiver.

3. A program control device, comprising a plurality of groups of program channel means, including an information group, a stipulation group, and a program instruction group, a read-out channel means included in said program instruction group of said program channel means, a program control card, means for advancing said card through the device, markings on said card for conditioning said program channel means for being electrically enabled, a data source, information output channel means in said data source, interconnecting means for electrically interconnecting said program channel means of said information group and said information output channel means, stipulation output channel means in said data source, means for electrically connecting said program channel means of said stipulation group to said stipulation output channel means of said data source, means generating an electric stipulation output signal in said stipulation output channel means of said data source, a data receiver, information input channel means in said receiver, settable electric circuit means connected to said program channel means, said program channel means of said stipulation group being enabled, when conditioned by said means of markings on said card, by the stipulation output signal for setting said electric circuit means, said read-out channel means, when conditioned by said means of markings on said card, causing said circuit means to enable said program channel means of said information group, being conditioned by said means of markings on said card, for electrically enabling said information output channel means in said data source and said information input channel means of said receiver.

4. A program control device, comprising a plurality of groups of program channel means, including an information group, a stipulation group, and a program instruction group, a duplicating channel means included in said program instruction group of said program channel means, a program control card, means for advancing said card through the device, markings on said card for conditioning said program channel means for being electrically enabled, a data source, stipulation output channel means in said data source, means for electrically connecting said program channel means of said stipulation group to said stipulation output channel means of said data source, means generating an electric stipulation output signal in said stipulation output channel means of said data source, a data receiver, information input channel means in said receiver, settable electric circuit means connected to said program channel means, said program channel means of said stipulation group being enabled, when conditioned by said means of markings on said card, by the stipulation output signal for setting said electric circuit means, said duplicating channel means, when conditioned by said means of markings on said card, causing said circuit means to enable said program channel means of said information group, being conditioned by said means of markings on said card, for electrically enabling said information input channel means in said receiver.

5. A program control device, comprising a plurality of groups of program channel means, including an information group, a stipulation group, and a program instruction group, a tabulation starting channel means and a tabulation stopping channel means included in said program instruction group of said program channel means, a program control card, feed means for advancing said card through the device, markings on said card for conditioning said program channel means for being electrically enabled, a data source, stipulation output channel means in said data source, means for electrically connecting said program channel means of said stipulation group to said stipulation output channel means of said data source, means generating an electric stipulation output signal in said stipulation output channel means of said data source, a data receiver, information input channel means in said receiver adapted to be enabled by said program channel means of said information group, settable electric circuit means connected to said program channel means, said program channel means of said stipulation group being enabled, when conditioned by said means of markings on said card, by the stipulation output signal for setting said electric circuit means, said tabulation starting channel means, when conditioned by said means of markings on said card, causing said circuit means to enable said feed means for advancing said card until said tabulation stopping channel means is conditioned by said means of markings on said card.

References Cited by the Examiner

UNITED STATES PATENTS

| | | | |
|---|---|---|---|
| 2,898,483 | 8/59 | Muller | 340—147 |
| 3,002,115 | 9/61 | Johnson et al. | 340—147 |

NEIL C. READ, *Primary Examiner.*